(12) United States Patent
Ziegler et al.

(10) Patent No.: US 6,698,938 B2
(45) Date of Patent: Mar. 2, 2004

(54) CONNECTION DEVICE FOR ESTABLISHING A COUPLING APPROPRIATE FOR SIGNAL TRANSMISSION

(75) Inventors: Jochen Ziegler, Stuttgart (DE); Rolf Steinbrunn, Karlsruhe (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/235,054

(22) Filed: Sep. 5, 2002

(65) Prior Publication Data

US 2003/0059172 A1 Mar. 27, 2003

(30) Foreign Application Priority Data

Sep. 27, 2001 (DE) .......................................... 101 47 809

(51) Int. Cl.⁷ ................................................. G02B 6/36
(52) U.S. Cl. ........................................ 385/77; 439/374
(58) Field of Search ................................ 439/131, 135, 439/136, 374, 929; 385/53–56, 76, 77, 78, 92

(56) References Cited

U.S. PATENT DOCUMENTS

| | | | | |
|---|---|---|---|---|
| 4,182,546 A | * | 1/1980 | Lukas et al. ............. | 350/96.21 |
| 5,265,182 A | * | 11/1993 | Hartley .................... | 385/77 |
| 6,224,270 B1 | * | 5/2001 | Nakajima et al. ......... | 385/78 |
| 6,579,014 B2 | * | 6/2003 | Melton et al. ............ | 385/76 |
| 6,612,750 B1 | * | 9/2003 | Bull et al. ................. | 385/65 |

\* cited by examiner

*Primary Examiner*—Khiem Nguyen
(74) *Attorney, Agent, or Firm*—Perman & Green, LLP

(57) ABSTRACT

A connection device for establishing a coupling appropriate for transmission of an electrical or optical signal between a first connector piece and a second connector piece includes

- a socket, into which the first connector piece, which is designed as a plug, can be plugged detachable in one plug direction, and
- a base on which the second connector part is mounted or is mountable.

The socket is adjustable with respect to the base transverse to the plug direction between a function position, in which the socket aligns with the second connector piece and in which the first connector piece can be plugged into the socket and is coupled with the second connector piece to transmit signals when plugged in, and a cleaning position, in which the socket is displaced to the side of the second connector piece and in which the second connector piece is exposed for cleaning.

16 Claims, 6 Drawing Sheets

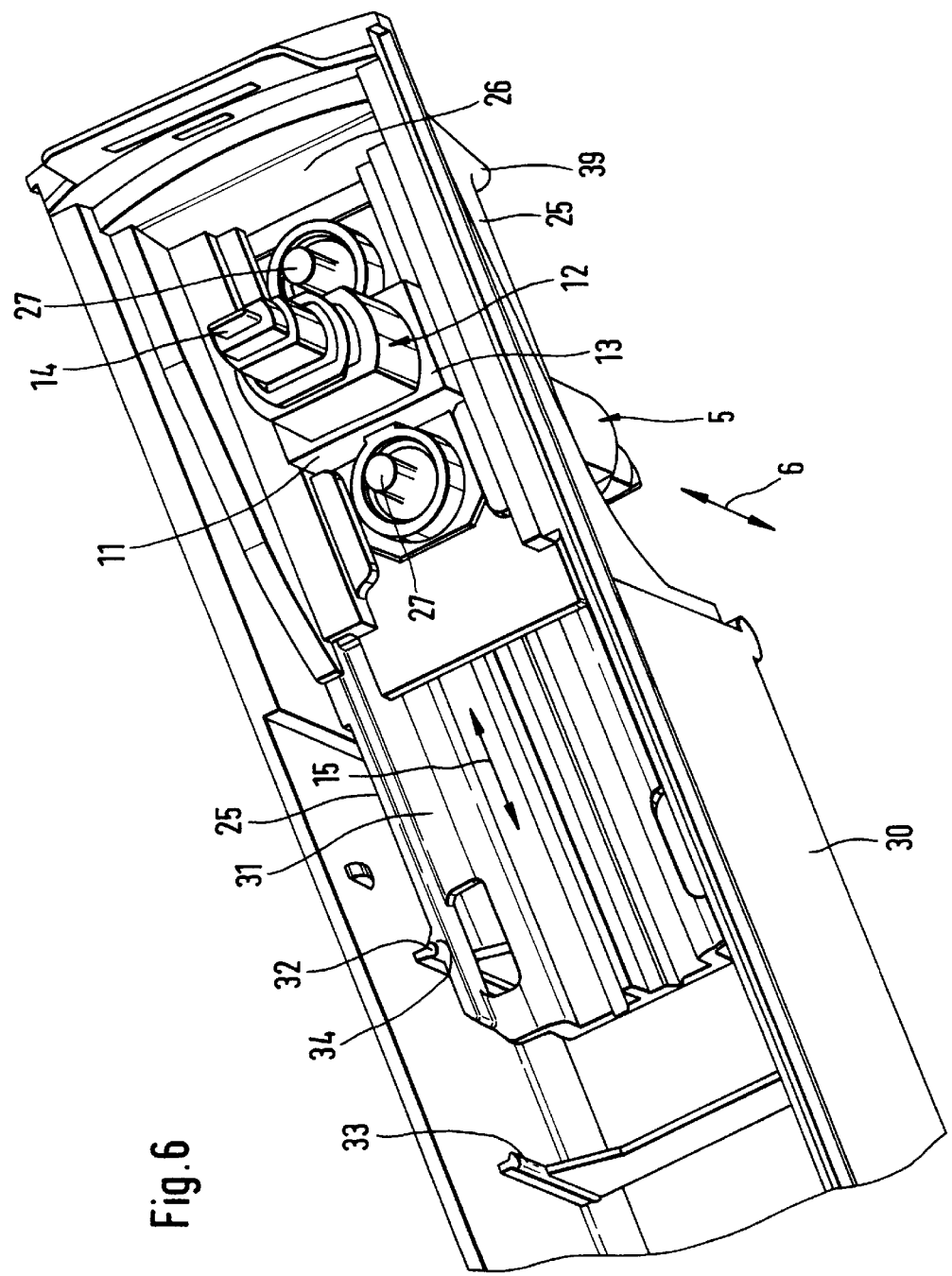

CONNECTION DEVICE FOR ESTABLISHING A COUPLING APPROPRIATE FOR SIGNAL TRANSMISSION

BACKGROUND OF THE INVENTION

The present invention concerns a connection device for establishing a coupling appropriate for transmission of an electrical or optical signal between a first connector piece and a second connector piece.

In order to be able to connect optical cables comprising one or several optical fibers (optical waveguides) so that an optical signal transmission can occur, connector pieces that provide optical contact zones can be mounted on the cable ends. These contact zones comprise level surfaces, for example, at which the respective optical fibers terminate. When these contact zones are optimally positioned with each other, a signal transmission of relatively high quality can be achieved. To establish such signal transmissions, connection devices of the type mentioned at the outset serve as connections that function like plug connectors and, when used appropriately, ensure that the optimal contact position between both connector parts is found.

In one essential application, the connection device is permanently mounted on an optical device or instrument to which the first connector piece, which is mounted to a cable, is to be connected from outside. In contrast, the second connector piece is already connected to the permanently installed connection device from inside. Since the purity of the optical signal increases and decreases with the quality of the connection attained, it is particularly important to clean the connector pieces regularly, especially their optical contact zones. If the connection device is installed in an appliance, cleaning the second connector piece, which has been mounted from inside, proves to be relatively difficult since it is either inaccessible or just difficult to access from the outside through the connection device. Cleaning is laborious as a result and requires considerable skill and precision. Since cleaning needs to be carried out regularly and relatively often to ensure a reliable signal transmission, the user often loses valuable time doing so.

SUMMARY OF THE INVENTION

The present invention deals with the issue of providing an embodiment for a connection device of the type mentioned at the outset, in which the second connector piece can be cleaned with relative ease.

This problem is solved by means of the object of the independent claim. Preferred embodiments are described in the dependent claims.

The present invention is based on the general notion of designing a socket provided to hold the first connector piece relative to a base provided to hold the second connector piece movable transverse to the plug direction of the first connector piece. Through this provision, the second connector piece, which is mounted in the base, can be removed for cleaning purposes by means of appropriate adjustment of the socket such that cleaning the second connector piece can be carried out with relatively little effort. The result is extreme simplification and time saved. This makes it possible especially to shorten the intervals between cleanings without too much time lost, whereby overall quality of the signal transmission can be maintained permanently at a relatively high level, even when connections are frequently changed. Particularly in connector parts for optical signal transmission, the optical contact zone of the second connector piece can be made easily accessible for cleaning by moving the socket.

According to a special embodiment, the base can provide several guide elements that stick out from the base in plug direction, wherein at least one of the guide elements is arranged on each side of the second connector piece relative to the adjustment direction of the socket, wherein the guide elements interact with the first connector piece when plugging it in to laterally guide in the plug direction, wherein the socket provides recesses corresponding to the guide elements and wherein the guide elements penetrate through and/or penetrate into the corresponding recesses when adjusting the socket into its function position. This construction simplifies locating the optimal relative position between both connector pieces with the help of the guide elements. In addition, these guide elements can be designed with very tight position tolerances on the base, in particular if the guide elements are produced as a single unit with the base. Secondly, when the first connector piece is plugged in, a positive-fit lock of the socket occurs automatically in its function position by means of these guide elements such that it is not possible to move the socket into its cleaning position when the first connector piece is plugged in without destroying the connection device. This measure allows active forces to be exerted onto the first connector piece to prevent stress between the contacting connector pieces.

In a subsequent design, at least one dowel pin can be arranged on the second connector piece that sticks out from the second connector piece in plug direction, wherein at least one pin opening is arranged on the first connector piece complementary thereto. In such an embodiment, two of the guide elements are positioned such that they align in the adjustment direction of the socket with each other and with the dowel pin, wherein the guide elements then stick out from the base such that their open ends are distanced equally as far or farther from the base than the free end of the dowel pin. Through this construction, the dowel pins and the respective pin openings ensure with very tight positional tolerances that the optimal contact position between both connector pieces is found. The special arrangement of the guide elements prevents unintended contact or even bending of the one or the several dowel pins in the cleaning position of the socket. In this respect, the guide elements also serve as a protection of the respective dowel pin.

In order that the socket sets in its function position and can be secured against being moved into its cleaning position unintentionally, if the first connector piece is not plugged into the socket, a transport cover that covers the socket can be provided that can be plugged with a plug section instead of the first connector piece into the socket that has been adjusted to its function position, wherein the plug section of the transport cover is dimensioned to interact with the guide elements such that a positive-fit between the guide elements and the socket is formed over the plug section in plug direction of the socket.

Other important characteristics and benefits of the invention emerge from the subclaims, from the drawings and from the respective figure descriptions by means for the drawings.

BRIEF DESCRIPTION OF THE DRAWINGS

The invention is explained below by means of reference to the drawings, wherein alike reference marks refer to alike or functionally equivalent or similar characteristics. It is shown schematically in FIG. 1 a perspective view of a connection device according to the invention designed on an apparatus, the socket of which is moved to its function position, FIG. 2 a view like in FIG. 1 but with a socket moved into its cleaning position, FIG. 3 a view like in FIG. 1 with a first connector piece not yet been plugged into the socket, FIG. 4 a view like in FIG. 3 but with a first connector piece plugged into the socket, FIG. 5 a view like in FIG. 1 with a transport cover not yet plugged into the socket and FIG. 6 a perspective view from below onto the inventive connection device.

DETAILED DESCRIPTION OF THE DRAWINGS

Figure 1:
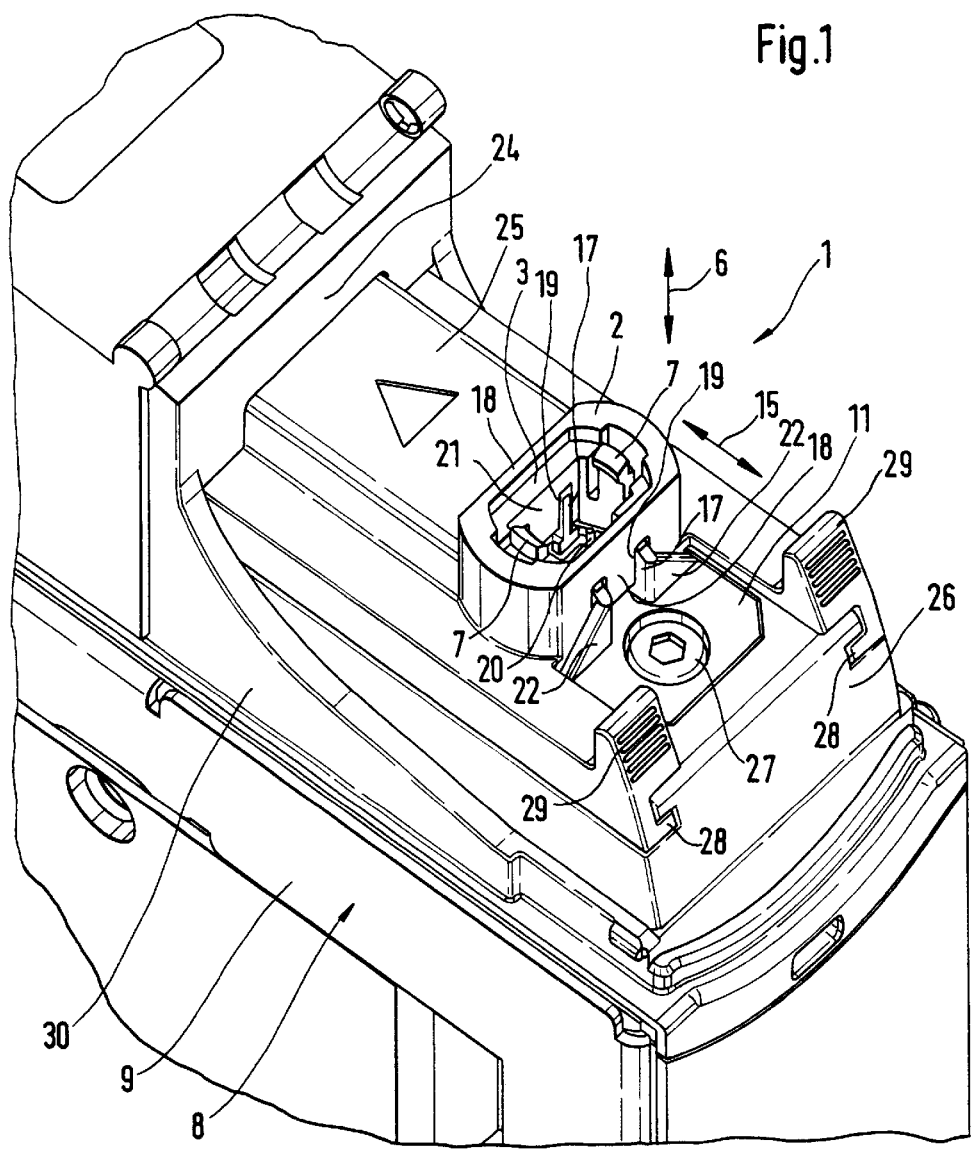
Figure 3:
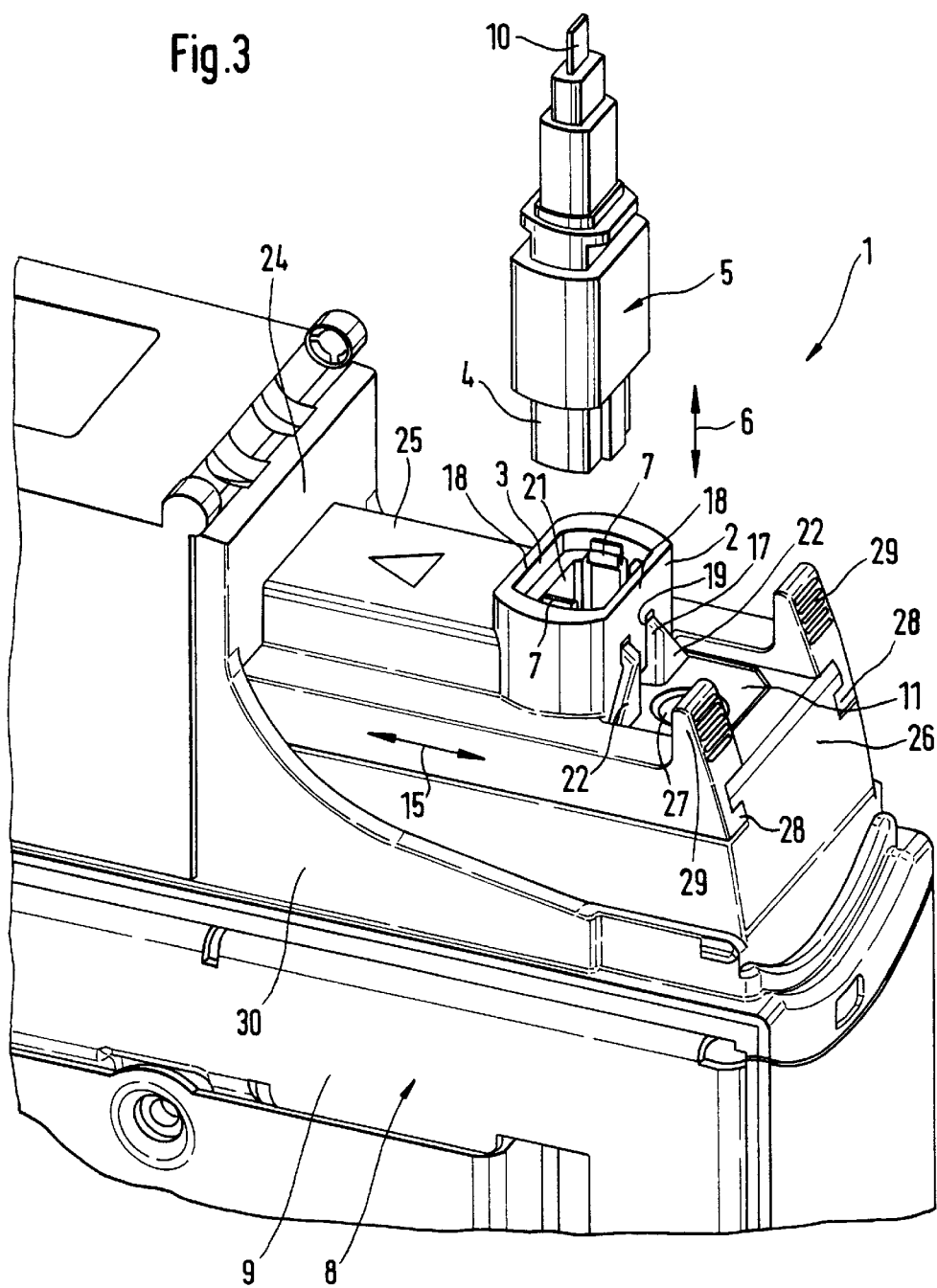
Figure 4:
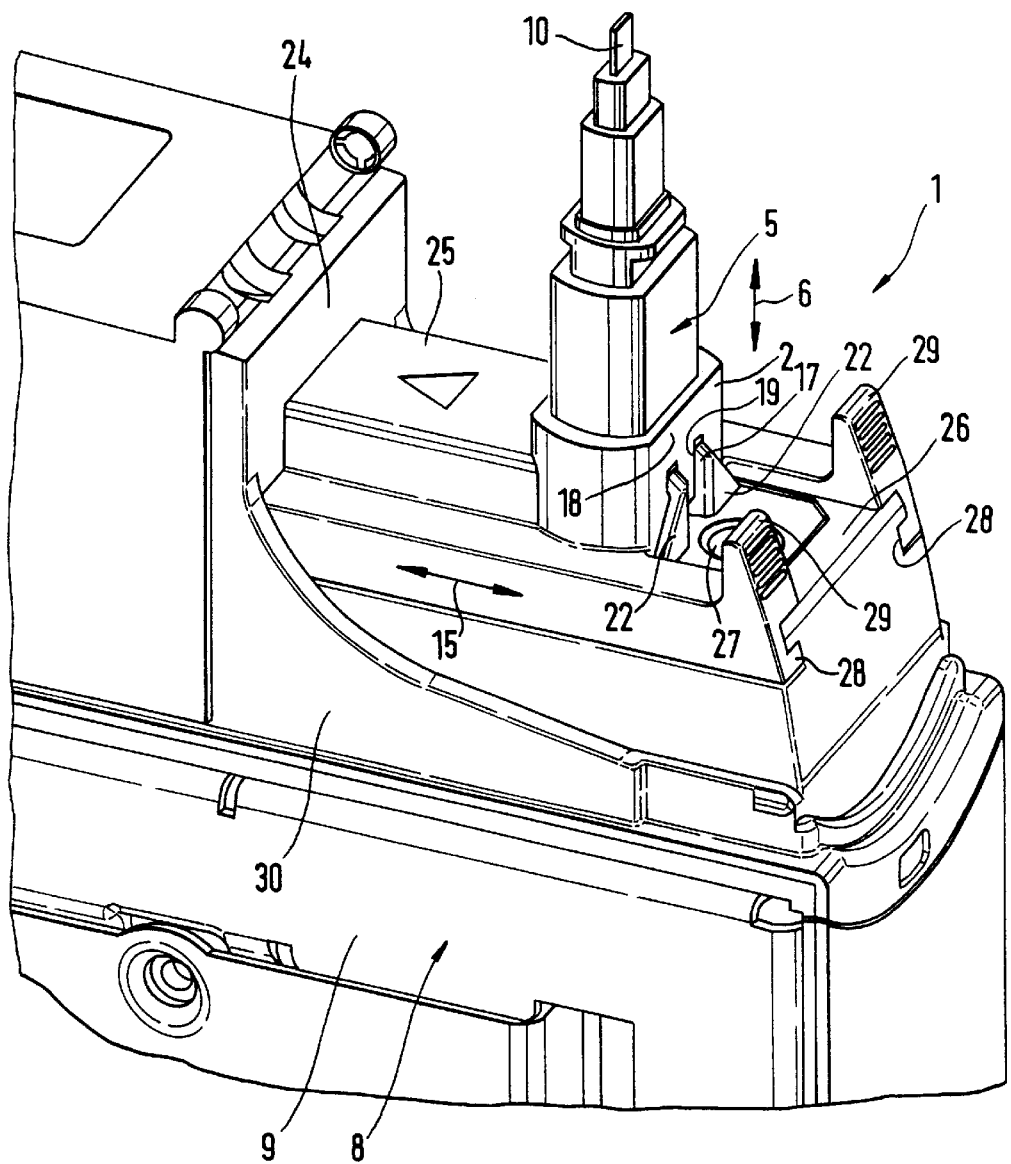

According to FIG. 1, a connection device 1 provides a socket 2, the receptacle opening 3 of which is arranged complementary to a plug piece 4 of a first connector piece 5 shown in FIG. 3 that is designed as a plug. As emanates from FIGS. 3 and 4, this first connector piece 5 can be plugged into the socket 2 and/or into its receptacle opening 3 according to a plug direction 6 symbolized by a double arrow. Lateral spring stops 7 are arranged in the socket 2 in a familiar manner that secure the first connector piece 5 plugged into the socket 2 in the plugged-in state. This type of plug connection is designed detachable, wherein the spring stops 7 initially unlock by turning the first connector piece of 5 counter to the plug direction 6 and the first connector piece 5 can finally be pulled out of the socket 2.

In the embodiment shown here, the connection device 1 is arranged on an instrument or device 8, wherein the connection device 1 is integrated into a housing 9 of this device 8. Subsequently, a cable 10 equipped with the first connector piece 5 can be connected to the device 8 via the connection device 1 (cf. FIGS. 3 and 4).

The instrument or device 8 can be a feature for measuring and/or testing components of electrical and/or optical networks or a modular component of such a feature. In particular, this feature and/or its module can comprise an electrical time domain reflectometer (TDR) or be designed as such, with which an electrical cable for example, in particular a coaxial transmission line, communication line, or another supply cable, such as a pipeline, can be characterized or gauged. The feature and/or its module can likewise comprise an optical time domain reflectometer (OTDR) or be designed as such that serves to characterize/gauge, for example, homogeneity reductions, disconnection splicing loss, or the length, etc. of one or several optical fibers. Furthermore, the feature and/or its module can especially comprise a wavelength division multiplexing test-set (WDM) or be designed as such that can be used to test/measure signals in wavelength multiplex systems.

Figure 2:
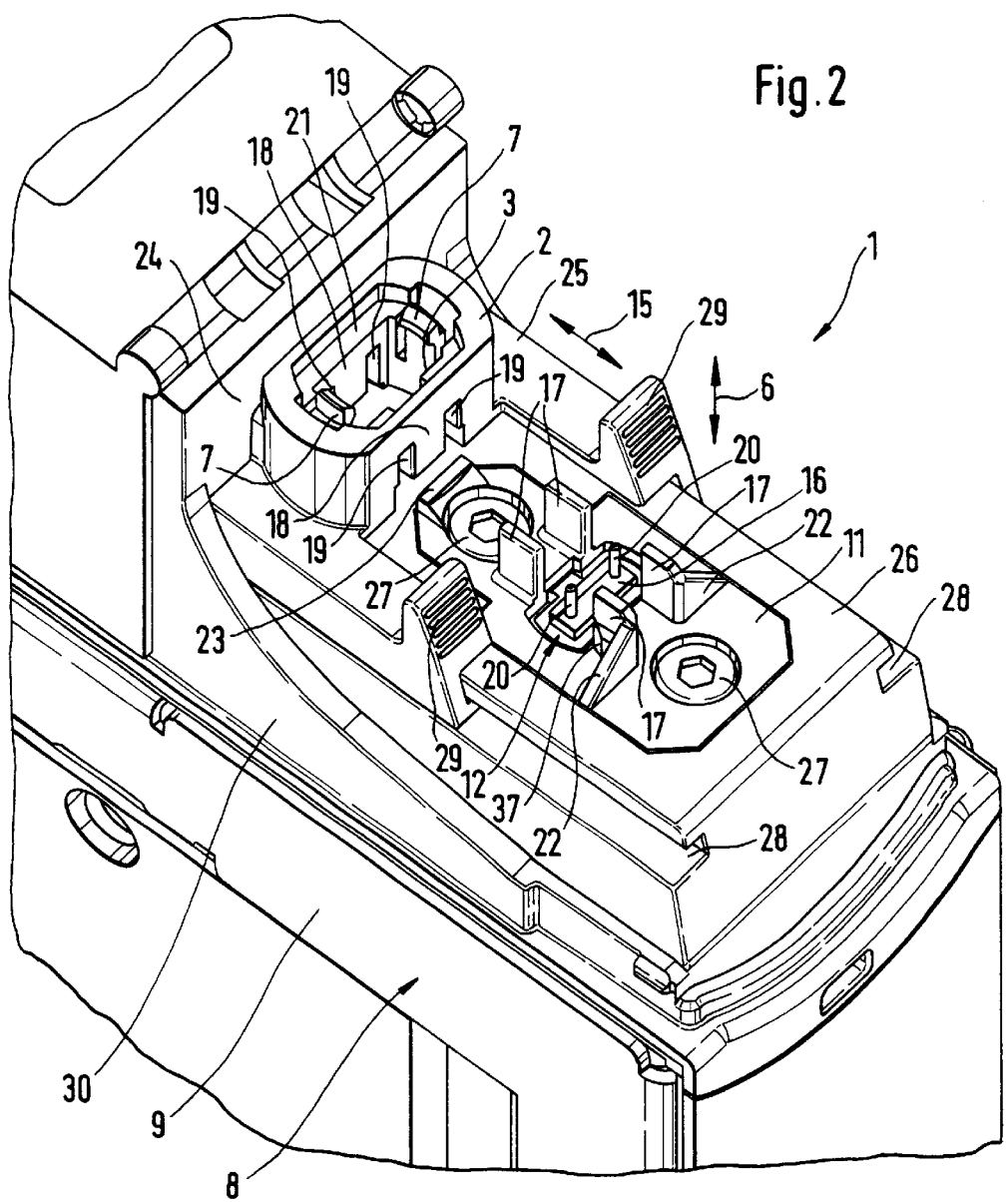

The connection device 1 further provides a base 11, on which a second connector piece 12 is mounted, which can be seen particularly clearly in FIGS. 2 and 6. Additionally, this second connector piece 12 is mounted on the base 11 in the interior of the device 8. The base 11 suitably provides a corresponding retainer 13 on the side facing the interior of the device that can be seen in FIG. 6, into which the second connector piece 12, likewise designed as a plug, can be plugged in the plug direction 6. It also makes sense here to design this plug connection detachable. The second connector piece 12 is likewise designed on the end of a cable 14, which is connected to a part housed therein in the interior of the device 8 that processes the signals transmitted via cable 14. Fundamentally, it possible to design both connector pieces 5 and 12 on the one hand and the socket 2 and the retainer 13 on the other hand with similar constructions to the extent that the second connector piece 12 can also be plugged into the socket 2 and the first connector piece 5 can be plugged into the retainer 13 appropriately. This simplifies mass production.

The connection device 1 ensures a coupling suitable for signal transmission between both connector parts 5 and 12 when the first connector piece 5 is plugged into the socket 2, wherein the present invention is particularly suited for connections with optical signal transmission. In this case, the cables 10 and 14 comprise one or several optical fibers, in particular fiberglass fibers. In another type of implementation, traditional cables for transmitting electrical signals may additionally or alternatively be connected with each other by means of the inventive connection device.

In accordance with the invention, the socket 2 is adjustable transverse to the plug direction 6 relative to the base 11 analogous to a double arrow 15 between a function position represented in FIGS. 1, 3, 4, 5 and 6 and a cleaning position shown in FIG. 2. In its function position the socket 2 aligns with the second connector piece 12 mounted in the base 11. In addition, the first connector piece 5 can be plugged into the socket 2 to achieve the signal transmitting coupling with the second connector piece 12. In contrast, the socket 2 is arranged displaced to the side in its cleaning position relative to the second connector piece 12 mounted in the base 11 such that the second connector piece 12 is exposed for cleaning. When it is a matter of connector pieces 5 and 12 establishing an optical signal transmission, as it is here, each connector piece 5 possesses an optical contact zone 16 that can be seen on the second connector piece 12 in the cleaning position of the socket 2 according to FIG. 2. Usually, this contact zone 16 comprises a high-grade, level surface area where the optical fibers terminate. In order to achieve an optical signal transmission with few losses, the contact zones 16 of both connector parts 5 and 12 must be installed in a predetermined relative position with relatively tight positional tolerances. In order to ensure a high-quality signal transmission, these contact zones 16 must be cleaned. Cleaning can be carried out particularly easily in the cleaning position of socket 2 since access to the second connector piece 12 is relatively unobstructed in the area of its contact zone 16 in this cleaning position.

According to FIG. 2, several guide elements 17 (here four) are arranged on base 11 that stick out from the base 11 in plug direction 6. The guide elements 17 are subsequently positioned such that relative to the adjustment direction 15 of the socket 2 two of these guide elements 17 are arranged opposite each other on each side of the second connector piece 12. These guide elements 17 are preferably designed as a single unit with the base 11 and are subsequently able to provide relatively tight positional tolerances relative to the retainer 13 and therefore relative to the second connector piece 12 mounted on the base 11. This promotes using the guide elements 17 for laterally guiding the first connector piece 5 in the plugging process. Moreover, the guide elements 17 ensure by means of their exact alignment that the relative position necessary for optimal contact between the contact zones 16 and/or between the contact pieces 5 and 12 is found.

The socket 2 is furnished with two recesses 19 on its walls 18, which run transverse to its adjustment direction 15, that are designed correspondent with the guide elements 17. These recesses 19 enable the guide elements 17 to go beyond when the socket 2 is adjusted. When adjusting the socket 2 in its function position, the guide elements 17 subsequently penetrate through the respective recesses 19 or penetrate into them, which can be seen in FIG. 1, for example.

To facilitate finding the optimal contact position between both connector parts 5 and 12 the second connector piece 12 is equipped with two dowel pins 20 that stick out in plug direction 6 from the second connector piece 12 and/or from its contact zones 16. In a corresponding manner, the first connector piece 5 is equipped with complementary pin openings that are not visible here. It is notable that every two guide elements 17 are suitably positioned such that they align with each other and with one of the dowel pins 20 in the adjustment direction 15 of the socket 2. Furthermore, the guide elements 17 each stick out from the base 11 so far that their open ends are distanced at least equally as far, however preferably farther than the open ends of the dowel pins 20 from the base 11. These features provide an additional protection for the dowel pins 20.

According to FIG. 1, the receptacle opening 3 of the socket 2 possesses a guide wall 21 in its interior that interacts with the first connector piece 5 upon plugging it in and that functions as a guide in the plug direction 6, in particular for locating the dowel pins 20. The recesses 19 punctuate this guide wall 21. The guide elements 17 and the respective recesses 19 can be coordinated to each other such that the guide elements 17 fill in the recesses 19 in the function position of the socket 2 and subsequently complete the guide wall 21 in the area of the punctuations.

The guide elements 17 also have another function as they secure the socket 2 in its function position when the first connector piece 5 is plugged into the socket 2. This is realized in that the socket 2 is supported interlocked on the guide elements 17 via the plug piece 4 of the connector part 5, which is plugged into the socket 2.

According to FIGS. 1 and 2, triangular stop elements 22 are designed on both guide elements 17, which are arranged on the side of the second connector part 12 facing the viewer, at which the socket 2 attaches outside in its function position according to FIG. 1. In addition, another heel-shaped stop element 23 may be provided, at which a component adjusted along with the socket 2 attaches inside in the function position of the socket 2. For the cleaning position, a wall 24 of the housing 9 serves as a limit stop, at which the socket 2 attaches in its cleaning position.

In the embodiments shown here, the socket 2 is designed permanent to a carriage element 25; the socket 2 is suitably produced as a single unit with this carriage element 25. The base 11 is mounted permanently relative to a base element 26. The base 11, for example, is fastened with screws 27 to the base element 26 or to the housing 9, on which also the base element 26 is permanently mounted. It is likewise possible to produce the base 11 as a single unit with the base element 26. The base element 26 is mounted on the housing 9 of the device 8. In one suitable embodiment the base element 26 is designed as a single unit with a section 30 of the housing. This section, to which the base element 26 is designed as an integral part, can be formed by a cover 30 of the housing 9, for example, that covers the housing 9 on top according to FIGS. 1 through 5. The carriage element 25 is mounted adjustable on the base element 26 in the adjustment direction of the socket 2 by means of a tongue-groove guiding mechanism 28. The carriage element 25 provides control tabs 29, with which the user can easily move the carriage element 25 along the base element 26.

According to FIG. 2, the guide elements 17, which are equipped with the stop elements 22, each provide a sloped aligning edge 37 in a base area on their exterior sides. These cause the carriage element 25 to be aligned transverse to the adjustment direction 15 in the function position.

According to FIG. 6, the carriage element 25 is elongated on the side facing away from the control tabs 29 by an appendage 31 that protrudes into the cover 30, on which the base element 26 is designed (integrally). Designed in the interior of this cover 30 are inwardly projecting stop tabs 32 and 33 that are able to interact with a notch 34 designed on the appendage 31. In the function position of the socket 2 shown in FIG. 3, the notch 34 is caught on the front stop tab 32, through which fixation of the socket in this position is achieved. If the socket 2 is moved into its cleaning position, the catch 34 contacts with the back stop tab 33 as soon as the socket 2 reaches its cleaning position according to FIG. 2, such that this socket position is also fixed.

Figure 5:
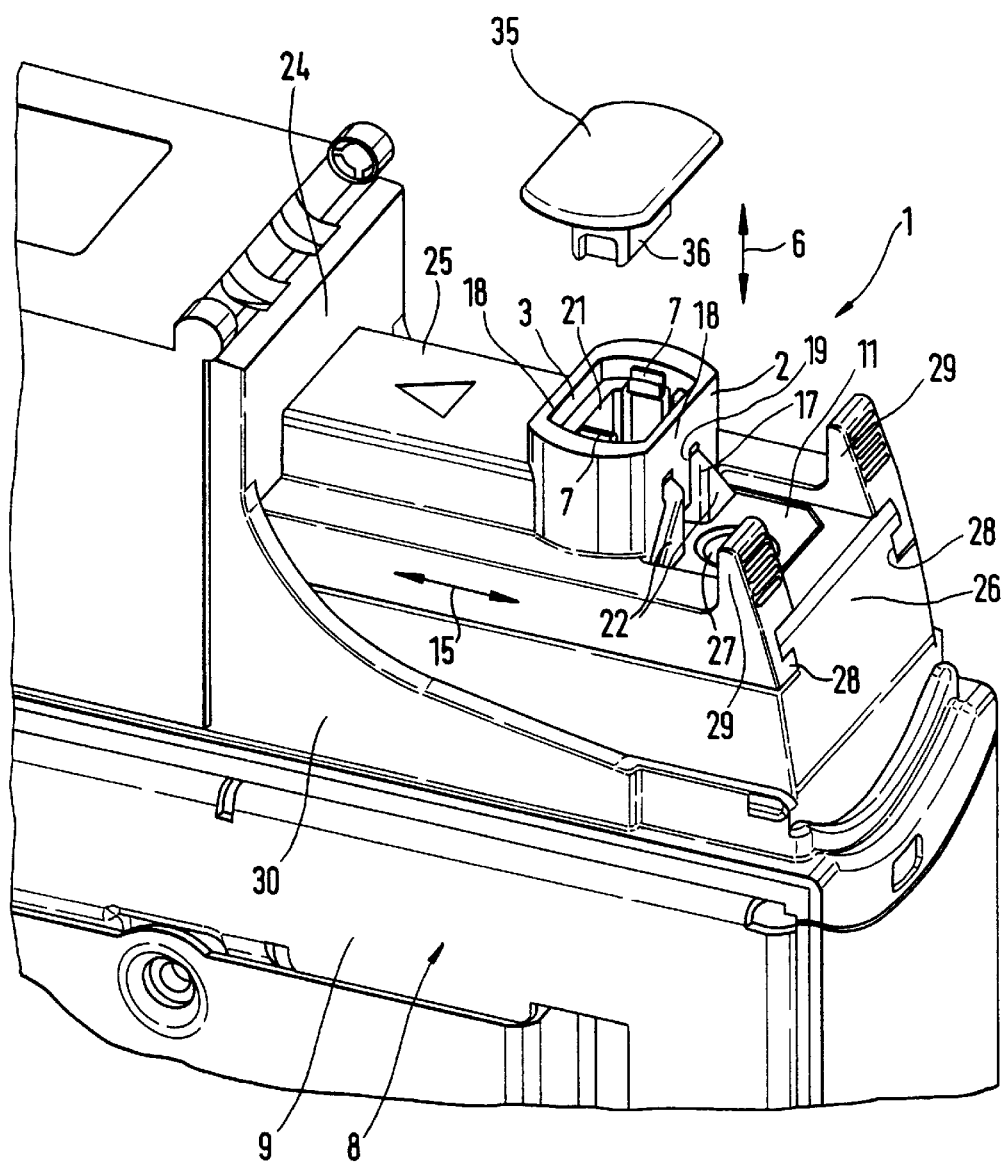

According to FIG. 5, the inventive connection device 1 can also comprise a transport cover 35 that provides a plug section 36. This plug section 36 is dimensioned such that instead of the first connection piece 5 the transport cover 35 can be plugged into the socket 2, which is adjusted to its function position, such that the plug section 36 also serves as an interlocked safety device for the function position of the socket 2. As with the first connector element 5, the socket 2 is supported interlocked over the plug section 36 on the guide elements 17 and thereby prevents the carriage element 25 and/or the socket 2 from slipping out of its function position. Furthermore, the transport cover 35 is dimensioned such that it covers the socket 2, thusly making a seal over the receptacle openings 3 that is relatively dustproof. The transport cover 35 subsequently serves as protection against grime as well as a positional securing device for the socket 2, through which the second connector part 12, in particular the sensitive optical contact zones 16, are prevented from become dirty at the same time.

What is claimed is:

1. A connection device adapted for establishing coupling appropriate for transmission of an electrical or optical signal between a first connector piece and a second connector piece, wherein:

the connection device provides a socket into which the first connector piece, designed as a plug, can be plugged in and detached in a plug direction, the connection device provides a base to which the second connector piece is mounted or is mountable, the socket is adjustable with respect to the base transverse to the plug direction between a function position, in which the socket aligns with the second connector piece mounted on the base and in which the first connector piece can be plugged into the socket and is coupled with the second connector piece to transmit signals when plugged in, and a cleaning position, in which the socket is arranged displaced to the side of the second connector piece mounted in the base and in which the second connector piece is exposed for cleaning purposes.

2. The connection device according to claim 1, wherein the base provides several guide elements that stick out from the base in the plug direction, wherein at least one of the guide elements is arranged on each side of the second connector piece relative to the adjustment direction of the socket, wherein the guide elements when plugging in the first connector piece interact with it to laterally guide in plug direction, wherein the socket provides recesses that correspond to the guide elements, wherein in their function position the guide elements penetrate through the corresponding recesses and/or penetrate into them when the socket is adjusted.

3. The connection device according to claim 2, wherein at least one dowel pin that sticks out in plug direction from the second connector piece is designed on the second connector piece, at least one dowel pin opening complementary thereto is designed on the first connector piece, wherein two of the guide elements are positioned to align in an adjustment direction of the socket with each other and with the dowel pin, wherein the guide elements stick out from the base so far that their open ends are distanced from the base equally as far or farther than the open end of the dowel pin.

4. The connection device according to claim 2, wherein the socket contains a receptacle opening for receiving the first connector piece that provides a guiding wall, with which it interacts when the first connector piece is plugged in, that is punctuated by the recesses, the guide elements and corresponding recesses are coordinated to each other such that the guide elements fill in the recesses of the guiding wall in the function position of the socket.

5. The connection device according to claim 2, wherein a transport cover that covers the socket is provided that can be plugged into the socket, which is set to its function position, with a plug section instead of the first connector piece, wherein the plug section is dimensioned to interact with the guide elements to create a form fit between the guide elements and the socket in the adjustment direction of the socket over the plug section.

6. The connection device according to claim 1, wherein the base provides at least one limit stop that the socket hits when it reaches its function position and/or cleaning position.

7. The connection device according to claim 1, wherein a fastener is provided that secures the socket in its function position and/or in its cleaning position.

8. The connection device according to claim 1, wherein the socket is designed permanent on a carriage element that is mounted movable on a base element in the adjustment direction of the socket, to which the base is permanently attached.

9. The connection device according to claim 8, wherein the socket is produced as a single unit with the carriage element and/or that the base is made as a single unit with the base element.

10. The connection device according to claim 1, wherein the base provides a retainer into which the second connector piece, which is designed as a plug, can be plugged in and detached in the plug direction.

11. The connection device according to claim 10, wherein a first connector piece and a second connector piece on the one hand, as well as a socket and retainer on the other hand are constructed similarly to the extent that the second connector piece can be plugged into the socket and the first connector piece can be plugged into the retainer such that both connector pieces are coupled with each other to transmit a signal.

12. The connection device according to claim 1, wherein the base or the base element is designed permanent on an instrument or device, wherein the second connector piece is connected with a component of the instrument or device that handles electrical or optical signals.

13. The connection device according to claim 12, wherein the instrument or device comprises a feature for measuring and/or testing components of electrical and/or optical networks.

14. The connection device according to claim 13, wherein the feature comprises a TDR or is designed as a TDR.

15. The connection device according to claim 13, wherein the feature comprises an OTDR or is designed as an OTDR.

16. The connection device according to claim 13, wherein the feature comprises a WDM or a WDN-tester or is designed as a WDM or WDM-tester.

* * * * *

UNITED STATES PATENT AND TRADEMARK OFFICE
CERTIFICATE OF CORRECTION

PATENT NO. : 6,698,938 B2
DATED : March 2, 2004
INVENTOR(S) : Ziegler et al.

It is certified that error appears in the above-identified patent and that said Letters Patent is hereby corrected as shown below:

Column 8,
Line 33, replace "WDN-tester" with -- WDM-tester --

Signed and Sealed this

Twentieth Day of July, 2004

JON W. DUDAS
*Acting Director of the United States Patent and Trademark Office*